United States Patent
Jeong et al.

(10) Patent No.: US 12,219,517 B2
(45) Date of Patent: Feb. 4, 2025

(54) METHOD AND APPARATUS FOR CONTROLLING NETWORK SLICE IN WIRELESS COMMUNICATION SYSTEM

(71) Applicant: Samsung Electronics Co., Ltd., Suwon-si (KR)

(72) Inventors: Sangsoo Jeong, Suwon-si (KR); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 18/059,188

(22) Filed: Nov. 28, 2022

(65) Prior Publication Data

US 2023/0091600 A1    Mar. 23, 2023

Related U.S. Application Data

(63) Continuation of application No. 17/092,088, filed on Nov. 6, 2020, now Pat. No. 11,516,762.

(30) Foreign Application Priority Data

Nov. 6, 2019 (KR) .......................... 10-2019-0141247
May 21, 2020 (KR) .......................... 10-2020-0061212

(51) Int. Cl.
*H04W 60/00*    (2009.01)
*H04W 48/18*    (2009.01)

(52) U.S. Cl.
CPC ........... *H04W 60/00* (2013.01); *H04W 48/18* (2013.01)

(58) Field of Classification Search
CPC .. H04W 60/00; H04W 48/18; H04W 28/0289
See application file for complete search history.

(56) References Cited

U.S. PATENT DOCUMENTS

2013/0007232 A1*  1/2013  Wang ................. H04L 63/0272
                                              709/222
2018/0324577 A1  11/2018  Faccin et al.
(Continued)

FOREIGN PATENT DOCUMENTS

CN    110022581 A    7/2019
EP    3471464 A1    4/2019
(Continued)

OTHER PUBLICATIONS

International Search Report and Written Opinion of the International Searching Authority in connection with International Application No. PCT/KR2020/015469 issued Feb. 10, 2021, 9 pages.
(Continued)

*Primary Examiner* — Marcus Hammonds

(57) ABSTRACT

A method, performed by a user equipment (UE), in a wireless communication system, includes: transmitting, to a network entity, a registration request message including network slice assistance information (NSSAI) corresponding to a slice; receiving a response message including rejection information on a registration for the slice in case that resource allocation has reached an upper limit; and determining to suspend a registration request for the slice, based on the response message, wherein the rejection information on the registration for the slice includes information on a back-off timer or information on a rejection cause.

19 Claims, 9 Drawing Sheets

(56) References Cited

U.S. PATENT DOCUMENTS

| | | | |
|---|---|---|---|
| 2018/0324663 A1 | 11/2018 | Park et al. | |
| 2019/0029065 A1 | 1/2019 | Park et al. | |
| 2020/0162919 A1 | 5/2020 | Velev et al. | |
| 2020/0177333 A1* | 6/2020 | Liu | H04W 76/25 |
| 2021/0029628 A1* | 1/2021 | Kim | H04W 48/18 |
| 2021/0204154 A1* | 7/2021 | Li | H04W 24/08 |
| 2022/0038897 A1* | 2/2022 | Liu | H04W 12/037 |
| 2022/0159605 A1* | 5/2022 | Li | H04W 76/10 |
| 2022/0200874 A1* | 6/2022 | Fendt | H04L 41/40 |

FOREIGN PATENT DOCUMENTS

| | | |
|---|---|---|
| EP | 3654692 A1 | 5/2020 |
| WO | 2019011190 A1 | 1/2019 |

OTHER PUBLICATIONS

Ericsson, "Registration reject due to no available allowed S-NSSAI(s)," C1-195187 (rev of C1-194760, 4494), 3GPP TSG-CT WG1 Meeting #119, Wroclaw, Poland, Aug. 26-30, 2019, 22 pages.

Supplementary European Search Report dated Sep. 26, 2022, in connection with European Patent Application No. 20884677.4, 13 pages.

Nec, ""S-NSSAI not available in the current PLMN" when non NSSAA supported UE requesting the S-NSSAI subjects to NSSAA," C1-196756, 3GPP TSG-CT WG1 Meeting #120, Portoroz (Slovenia), Oct. 7-11, 2019, 23 pages.

Nec et al., "Need of slice based AMF overload control at NG-RAN," S2-1906365, 3GPP TSG SA2 #133, May 13-17, 2019, Reno, Nevada, 6 pages.

NTT Docomo et al., "New Key Issue on support for network slice quota enforcement in a network slice," S2-1910749, SA WG2 Meeting #135, Oct. 14-18, 2019, Split, HR, 3 pages.

Examination report dated Feb. 10, 2023, in connection with Indian Application No. 202237026136, 5 pages.

The First Office Action dated Mar. 30, 2024, in connection with Chinese Application No. 202080077397.8, 15 pages.

Hearing Notice dated May 15, 2024, in connection with Indian Application No. 202237026136, 3 pages.

Communication under Rule 71(3) EPC dated Aug. 7, 2024, in connection with European Application No. 20884677.4, 49 pages.

* cited by examiner

METHOD AND APPARATUS FOR CONTROLLING NETWORK SLICE IN WIRELESS COMMUNICATION SYSTEM

CROSS-REFERENCE TO RELATED APPLICATIONS

This application is a continuation of application Ser. No. 17/092,088, filed Nov. 6, 2020, now U.S. Pat. No. 11,516,762, which is based on and claims priority under 35 U.S.C. § 119 to Korean Patent Application Nos. 10-2019-0141247, filed on Nov. 6, 2019 and 10-2020-0061212 filed on May 21, 2020, in the Korean Intellectual Property Office, the disclosures of which are incorporated by reference herein in their entirety.

BACKGROUND

1. Field

The disclosure relates to a method and apparatus for controlling a network slice in a wireless communication system.

2. Description of Related Art

To meet the demand for ever-increasing wireless data traffic after commercialization of the 4th generation (4G) communication system, there have been efforts to develop an advanced 5th generation (5G) or pre-5G communication system. For this reason, the 5G or pre-5G communication system is also called a beyond 4th-generation (4G) network communication system or post long term evolution (LTE) system.

Implementation of the 5G communication system using ultra-frequency (mmWave: millimeter wave) bands, e.g., 60 giga-Hertz (GHz) bands is considered to achieve higher data rates. To reduce propagation loss of radio waves and increase a transmission range of radio waves in the ultra-frequency bands, beamforming, massive multiple-input multiple-output (MIMO), full dimensional MIMO (FD-MIMO), array antenna, analog beamforming, and large-scale antenna techniques are under discussion.

To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system.

In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

With the development of various information technologies (ITs), virtualization techniques are applied to network equipments, enabling the network equipments to evolve to virtualized network functions (NFs). As the virtualized NFs are free from physical constraints and implemented in software, they may be installed/operated in various types of clouds or data centers (DCs). In particular, the NF may be freely scaled, initiated, or terminated depending on service requirements, system capacity, or network load. The NFs need to be driven basically in a physical entity, e.g., a certain equipment even though implemented in software, so it is noted that physical entities in relation to the NFs are not left out of consideration. Alternatively, the NFs may be implemented in a simple physical configuration, i.e., in hardware.

A network slicing technology has been introduced to support various services in such various network architectures. Network slicing is a technology that logically configures a network into a set of NFs to support a certain service, and separate one slice from another slice. A terminal may access two or more slices to receive various services.

SUMMARY

An embodiment of the disclosure may provide a method and apparatus for providing services more efficiently.

Additional aspects will be set forth in part in the description which follows and, in part, will be apparent from the description, or may be learned by practice of the presented embodiments of the disclosure.

According to an embodiment of the disclosure, a method, performed by a user equipment (UE), in a wireless communication system, includes: transmitting, to a network entity, a registration request message including network slice assistance information (NSSAI) corresponding to a slice; receiving a response message including rejection information on a registration for the slice in case that resource allocation has reached an upper limit; and determining to suspend a registration request for the slice, based on the response message, wherein the rejection information on the registration for the slice includes information on a back-off timer or information on a rejection cause.

The method may further include determining, based on the response message, whether the registration request is rejected or pended in an entire Public Land Mobile Network (PLMN) or a first registration area.

The method may further include performing a registration procedure on a second registration area, in case that the registration request is rejected or pended in the first registration area and not in the entire PLMN.

The determining to suspend the registration request for the slice may further include determining, based on the information on the back-off timer, not to perform the registration request for the slice until the back-off timer expires.

The method may further include starting the registration request for the slice in case that the back-off timer expires.

According to an embodiment of the disclosure, a user equipment (UE) in a wireless communication system includes: a transceiver; and at least one processor coupled with the transceiver and configured to: transmit, to a first network entity, a registration request message including network slice assistance information (NSSAI) corresponding to a slice, determine, based on the registration request message, whether resource allocation has reached an upper limit, receive a response message including rejection information on a registration for the slice based on the determining result, and determine to suspend a registration request for the slice, based on the response message, wherein the rejection information on the registration for the slice includes information on a back-off timer or information on a rejection cause.

The at least one processor may be further configured to determine, based on the response message, whether the registration request is rejected or pended in an entire Public Land Mobile Network (PLMN) or a first registration area.

The at least one processor may be further configured to perform a registration procedure on a second registration area, in case that the registration request is rejected or pended in the first registration area and not in the entire PLMN.

The at least one processor may be further configured to determine, based on the information on the back-off timer, not to perform the registration request for the slice until the back-off timer expires.

The at least one processor may be further configured to start the registration request for the slice in case that the back-off timer expires.

According to an embodiment of the disclosure, a method, performed by a network entity, in a wireless communication system, includes: receiving a registration request message including network slice assistance information (NSSAI) corresponding to a slice; determining, based on the registration request message, whether resource allocation has reached an upper limit; and transmitting a response message including rejection information on a registration for the slice, based on a result of the determining; wherein a registration request for the slice is suspended based on the response message, and wherein the rejection information on the registration for the slice includes information on a back-off timer or information on a rejection cause.

The registration request may be rejected or pended in an entire Public Land Mobile Network (PLMN) or a first registration area.

A registration procedure may be performed on a second registration area, in case that the registration request is rejected or pended in the first registration area and not in the entire PLMN.

The registration request for the slice may be determined, based on the information on the back-off timer, not to perform the registration request for the slice until the back-off timer expires.

According to an embodiment of the disclosure, a network entity in a wireless communication system includes: a transceiver; and at least one processor coupled with the transceiver and configured to: receive a registration request message including network slice assistance information (NSSAI) corresponding to a slice, determine, based on the registration request message, whether resource allocation has reached an upper limit, and transmit a response message including rejection information on a registration for the slice, based on a result of the determining, wherein a registration request for the slice is suspended based on the response message, and wherein the rejection information on the registration for the slice includes information on a back-off timer or information on a rejection cause.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
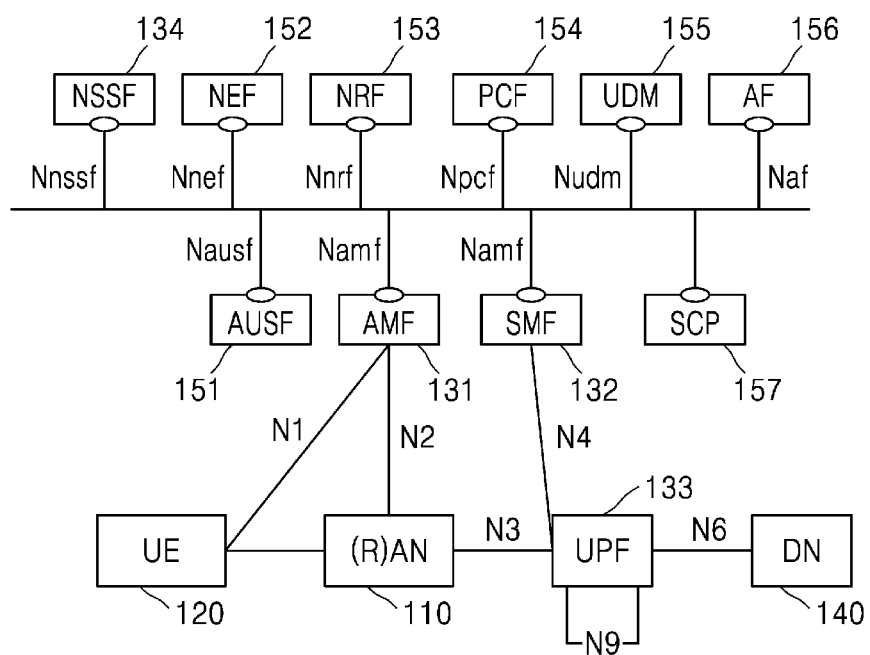
FIG. 1 illustrates a wireless communication system, according to an embodiment of the disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will be described in detail with reference to accompanying drawings. Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It may be understood that respective blocks and combinations of the blocks in processing flowcharts will be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternate embodiments of the disclosure. For example, two successive blocks may be performed substantially at the same time or in reverse order.

Furthermore, the term 'unit' or 'module' as herein used refers to a software or hardware component, such as field programmable gate array (FPGA) or application specific integrated circuit (ASIC) which plays a certain role. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments, the module may include one or more processors.

Herein, the terms to identify access nodes, the terms to refer to network entities, the terms to refer to messages, the terms to refer to interfaces among network entities, the terms to refer to various types of identification information, etc., are examples for convenience of explanation. Accordingly, the disclosure is not limited to the terms as herein used, and may use different terms to refer to the items having the same meaning in a technological sense.

Throughout the disclosure, the expression "at least one of a, b or c" indicates only a, only b, only c, both a and b, both a and c, both b and c, all of a, b, and c, or variations thereof.

A terminal may include a user equipment (UE), a mobile station (MS), a cellular phone, a smart phone, a computer, or a multimedia system capable of performing a communication function.

In the disclosure, a controller may also be referred to as a processor.

In the disclosure, a layer (or a layer apparatus) may also be referred to as an entity.

Throughout the specification, terms and definitions defined by standards for fifth generation (5G), new radio (NR), and long term evolution (LTE) systems will be used for convenience of explanation. The disclosure is not, however, limited to the terms and definitions, and may equally apply to any systems that conform to other standards.

Although embodiments of the disclosure will be primarily focused on communication standards defined by the third generation partnership project (3GPP), the subject matter of the disclosure may also be applicable to other communication systems with a similar technical background with minor changes without significantly departing from the scope of the disclosure, which may be possible under the determination of those of ordinary skill in the art to which the disclosure pertains.

Furthermore embodiments of the disclosure will be primarily focused on a vehicle communication service, but the subject matter of the disclosure may also be applicable to other services provided in 5G networks with minor changes without significantly departing from the scope of the disclosure, which may be possible under the determination of those of ordinary skill in the art to which the disclosure pertains. In the disclosure, for example, a proximity service (ProSe) layer may refer to an overall layer that performs control operations for device to device (D2D) or ProSe communication services. The ProSe layer exists over an Access Stratum (AS) layer and refers to a layer that exchanges signaling with the AS layer for D2D communication connection.

The 5G system is considering support for various services in contrast to the existing 4G system. For example, the most representative services may include an enhanced mobile broad band (eMBB) communication service, an ultra-reliable and low latency communication (URLLC) service, a massive machine type communication (mMTC) service, an evolved multimedia broadcast/multicast service (eMBMS), etc. A system for providing the URLLC service may be referred to as a URLLC system, and a system for providing the eMBB communication service may be referred to as an eMBB system. The terms 'service' and 'system' may be interchangeably used.

Embodiments of the disclosure provide a method and apparatus for supporting various services in a wireless communication system. Specifically, a technology to support various services by supporting mobility of the UE in a wireless communication system will be described in the disclosure.

Herein, terms to identify access nodes, terms to refer to network entities or network functions (NFs), terms to refer to messages, terms to refer to interfaces between network entities, terms to refer to various types of identification information, etc., are examples for convenience of explanation. Accordingly, the disclosure is not limited to the terms as herein used, and may use different terms to refer to the items having the same meaning in a technological sense.

For convenience of explanation, the disclosure will hereinafter use terms and definitions defined by the 3GPP LTE and 5G standards. The disclosure is not, however, limited to the terms and definitions, and may equally apply to any systems that conform to other standards.

Entities that exchange information for access control and status management will now be collectively called 'NFs' for convenience of explanation. For example, the NF may be at least one of an access and mobility management function (AMF) device, a session management function (SMF) device, or a network slice selection function (NSSF) device. Embodiments of the disclosure may, however, be equally applied to an occasion when the NF is implemented as an instance, e.g., an AMF instance, an SMF instance, an NSSF instance, etc.

In an embodiment of the disclosure, delivering information or policies about a radio access technology (RAT) has the same meaning as delivering information that may be used for selecting a certain RAT, i.e., information about an access type or a policy.

FIG. 1 illustrates a wireless communication system, according to an embodiment of the disclosure.

Referring to FIG. 1, a radio access node (RAN) 110 and a UE 120 are shown as part of nodes that use a radio channel in a wireless communication system. Although there is one RAN 110 and one UE 120 shown in FIG. 1, another RAN, which is identical or similar to the RAN 110, may be further included. Furthermore FIG. 1 is focused on an occasion when the single UE 120 performs communication in the single RAN 110. It is, however, obvious that there may be a plurality of UEs communicating in the single RAN 110.

The RAN 110 is a network infrastructure that provides wireless access for the UE 120. The RAN 110 has coverage defined to be a certain geographical area based on a range within which a signal may be transmitted from the RAN 110 (not shown in FIG. 1). The RAN 110 may also be referred to as a base station (BS), an access point (AP), an eNodeB (eNB), a 5G node, a wireless point, a transmission/reception point (TRP), or other terms having equal technical meaning.

The UE 120 is a device used by a user, which performs communication with the RAN 110 through a radio channel. In some cases, the UE 120 may be operated without intervention of the user. For example, the UE 120 is a device for performing machine type communication (MTC), which may not be carried by the user. The UE 120 shown in FIG. 1 may include at least one user portable device, which may include at least one MTC. The UE 120 may also be referred to as a terminal, an MS, a subscriber station, a remote terminal, a wireless terminal, a user device, or other terms having equal technical meaning.

An AMF device 131 may be a network entity that manages mobility of the UE 120. An SMF device 132 may be a network entity that manages connection of a packet data network for providing packing data to the UE 120. Connection between the UE 120 and the SMF 132 may be a packet data unit (PDU) session.

A user plane function (UPF) device 133 may be a gateway that delivers packets transmitted or received by the UE 120 or a network entity that serves as the gateway. The UPF device 133 may be connected to a data network (DN) 140 via the Internet to provide a path between the UE 120 and the DN 140 for data transmission or reception. Accordingly, the UPF device 133 may route data to be delivered to the Internet from among the packets transmitted by the UE 120 to an Internet data network.

An NSSF device 134 may be a network entity that performs a network selection operation, e.g., an operation of selecting a network slice, as will be described in the disclosure. Operations of the NSSF device 134 will be described in detail later in connection with the drawings.

An authentication server function (AUSF) device 151 may be a network entity that provides a subscriber authentication service.

A network exposure function (NEF) device 152 may be a network entity that is able to access information for managing the UE 120 in the 5G network, subscribe to a mobility management event of the UE 120, subscribe to a session management event of the UE 120, request session-related information, set charging information of the UE 120, request a change in PDU session policy for the UE 120, and transmit a small amount of data for the UE 120.

A network repository function (NRF) device 153 may be an NF or network entity that stores an NF profile containing information about details of each NF or status information of the NF or NF instance, and may deliver the NF profile or the status information stored therein when requested by another NF.

A policy and charging function (PCF) device 154 may be a network entity that applies a mobile communication operator's service policy, charging policy, and PDU session policy for the UE 120.

A unified data management (UDM) device 155 may be a network entity that stores information about a subscriber and/or the UE 120.

An application function (AF) device 156 may be a service application server or network entity which work with a network to provide a service.

The aforementioned AMF device 131, the SMF device 132, the UPF device 133, the NSSF device 134, the AUSF device 151, the NEF device 152, the NRF device 153, the PCF device 154, the UDM device 155, the AF device 156, and the SCP 157 device may have the form of software or firmware to be driven in at least one of devices and/or systems. Alternatively, the devices 131, 132, 133, 134, 151, 152, 153, 154, 155, 156, and 157 may be implemented in hardware when required. In the following description, these terms will be simply expressed without the word 'device'. For example, the AMF device 131 will be called AMF 131, and the SMF device 132 will be called SMF 132.

In the meantime, symbols by lines connecting between each network entity, the UE 120, and the RAN 110 may denote interfaces for the respective entities. For example, interface N1 may be used between the UE 120 and the AMF 131, interface N2 may be used between the RAN 110 and the AMF 131, and interface N3 may be used between the RAN 110 and the UPF 133. Likewise, interface N4 may be used between the SMF 132 and the UPF 133, interface N9 may be used between UPFs 133 or within the UPF 133, and interface N6 may be used between the UPF 133 and the DN 140.

Figure 2:
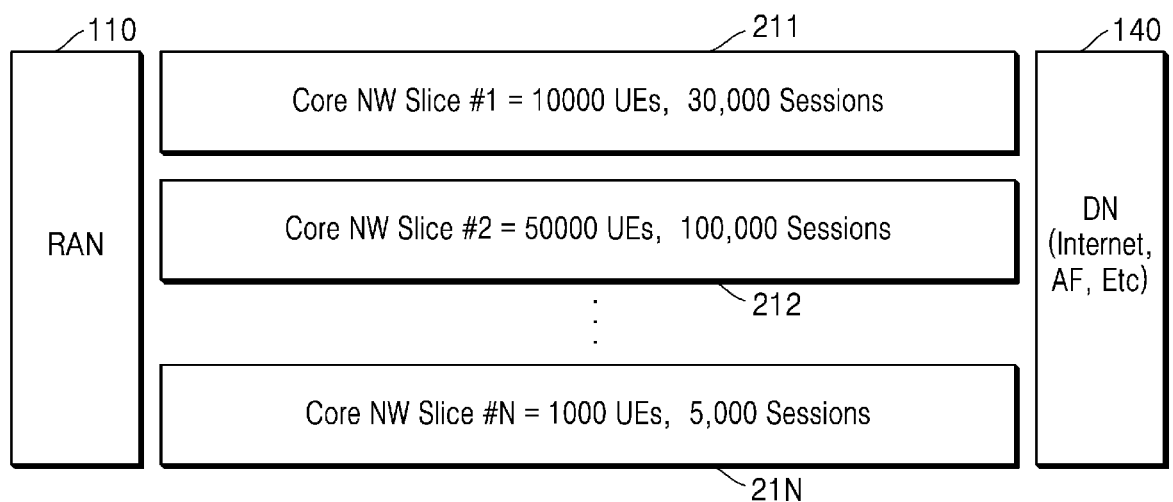
FIG. 2 illustrates a configuration of a wireless communication system, according to an embodiment of the disclosure.

FIG. 2 shows a configuration of a wireless communication system, according to various embodiments of the disclosure.

Referring to FIG. 2, a mobile communication system (e.g., a 5G or 4G operator network) may include a wireless base station, e.g., the RAN 110, and one or more core network slices. In FIG. 2, there are N core network slices 211, 212, . . . , 21N shown. The RAN 110 may perform data transmission or reception between a UE, e.g., the UE 120 of FIG. 1, and the DN 140 through at least one core network slice. Depending on the operator network configuration, a core network may be configured in the form of slices or without slices, or may coexist between them. A core network slice may basically include one or more core network NFs. NFs corresponding to a core network may include the AMF 131, the SMF 132, and the UPF 133. In another embodiment of the disclosure, the NFs may include at least one of the AMF 131, the SMF 132, or the UPF 133. In still another embodiment of the disclosure, the NFs may further include other network function device in addition to the AMF 131, the SMF 132, and the UPF 133. In yet another embodiment of the disclosure, the NFs may include at least one of the AMF 131, the SMF 132, or the UPF 133, and further include at least one other device than the aforementioned devices.

In an embodiment of the disclosure, the network slices 211, 212, . . . , and 21N may respectively provide services suited to their characteristics, and capacities that may be simultaneously provided by the respective network slices 211, 212, . . . , and 21N may be different. The capacities of the network slices 211, 212, . . . , and 21N may each correspond to e.g., the maximum number of UEs (subscribers) and the number of sessions. Each of the network slices 211, 212, . . . , and 21N may control access to a network based on its capacity.

Referring to FIG. 2, for example, the first network slice 211 may be accessed by 10,000 UEs and accommodate 30,000 sessions. The second network slice 212 may be accessed by 50,000 UEs and accommodate 100,000 sessions. The N-th network slice 21N may be accessed by 1,000 UEs and accommodate 5,000 sessions.

As shown in FIG. 2, capacities of the respective network slices 211, 212, . . . , and 21N may be differently set according to the mobile communication operator's settings. When a certain single slice is leased or sold to a separate service provider, capacities for the respective slices may be differently set according to a service level agreement (SLA).

In an embodiment of the disclosure, a capacity or quota of a network slice may be represented by at least one of the following parameters:

1. the maximum number of subscribers, UEs, or users that may concurrently access the network slice
2. the maximum number of sessions or PDU sessions that may be simultaneously supported by the network slice
3. the maximum number of Internet protocol (IP) flows that may be simultaneously supported by the network slice
4. the maximum number of quality of service (QoS) flows that may be simultaneously supported by the network slice
5. the maximum number of guaranteed bit rate (GBR) flows that may be simultaneously supported by the network slice In an embodiment of the disclosure, the capacity of a single network slice may be set based on the number of UEs that may simultaneously access the network slice (parameter 1) and the maximum number of sessions that may be simultaneously supported by the network slice (parameter 2). Furthermore, the capacity of a single network slice may be set using at least one, or two or more of the aforementioned parameters.

The parameters related to sessions and flows (e.g., parameters 2 to 5 among the aforementioned parameters) may be represented by a certain value for each slice (e.g., support 10,000 sessions per network slice), or by a certain value for each UE that accesses the network slice (e.g., support up to 4 sessions at a time for each UE that accesses the network slice).

In an embodiment of the disclosure, with capacity control for each network slice, an operator's mobile communication network may be protected from being overloaded, resources of the network may be effectively used, and accurate charging between the mobile communication operator and the network slice user may be performed.

In an embodiment of the disclosure, when quota-based access control for each network slice is performed, it may happen to reach a limit of the quota actually set for the network slice. In the case that the quota for the network slice is set as the maximum number of concurrent access users (or UEs), when an access request beyond the quota occurs, a technology to deal with this is required.

In an embodiment of the disclosure, a method of dealing with an access request occurring when the maximum number of concurrent access users has reached a quota limit may be proposed as follows:

1) access reject: a UE that has transmitted the access request may be informed in a reject message that the access request was rejected, in which case the UE may find that slice quota-based control is a cause of the rejection (e.g., because a maximum value set for the quota has been reached). Furthermore, the UE may receive a value of a timer for a re-access request to be accepted. When the access request is a request to register for the slice(s) and the request is rejected in a process of controlling the maximum number of access users, the timer is applied to the slice(s) and the UE is required not to retransmit the access request for the slice(s) until the timer is expired. When the access request is about a session (data network name (DNN)) mapped to a certain slice and the request is rejected in a process of controlling the maximum number of sessions, the timer is applied to the slice(s) and the DNN(s) mapped thereto and the UE is required not to transmit a session creation request for the slice(s) and the DNN(s) mapped thereto again until the timer is expired. When the timer is expired, the UE may re-transmit a request for access or session creation.

2) fallback to another slice or RAT: instead of the slice requested for access, another slice may be selected (fallback) and an access (or session creation) procedure for the UE may be performed. In this case, information about whether fallback is allowed or about a default slice for fallback, or RAT information may be included in unified data management (UDM) based subscription data or in a policy control function (PCF) based access control policy, or may use a value set in the AMF/SMF. When fallback to another slice occurs, the UE that has transmitted the access request may be informed in a message that the access (or session creation) request is accepted. In this case, the message includes information indicating that use of a slice requested by the UE is rejected because the slice exceeds its maximum allowable capacity but fallback to another slice is allowed. When fallback to another RAT occurs, information indicating that a registration request currently received is rejected and instructing to move to another RAT may be given, or information indicating that the registration request currently received is accepted but the slice(s) requested by the UE is rejected because the capacity is exceeded and instructing to shift to another RAT may be included. Furthermore, the UE may receive a value of a timer for a re-access request to be accepted. When the access request is a request to register for the slice(s) and fallback occurs in a process of controlling the maximum number of user accesses, the timer is applied to the slice(s) and the UE is required not to transmit a request to change the slice(s) again until the timer is expired. When the access request is about a session (DNN) mapped to a certain slice and fallback to another DNN occurs in a process of controlling the maximum number of sessions, the timer is applied to the slice(s) and the DNN(s) mapped thereto and the UE is required not to transmit a session creation change request for the slice(s) and the DNN(s) mapped thereto until the timer is expired. When the timer is expired, the UE may re-transmit a request for access or session creation to change the slice. In another embodiment of the disclosure, when a 5G core (5GC) is able to know that the slice, to which fallback has been applied, becomes accessible, it may transmit to the UE a message indicating that it is possible for the UE to change and have access to the originally requested slice(s) or DNN. The message indicating the change may include information instructing to change NFs such as the AMF or SMF due to the changed slice and perform a non-access stratum (NAS) procedure for the change. When there is no need for the change in NF, a UE having received this may consider that the slice has been changed and operate accordingly, and when a change in NF is required, the UE may perform an operation for dealing with the change in NF (e.g., registration for an AMF change or PDU session establishment for an SMF change).

Figure 3:
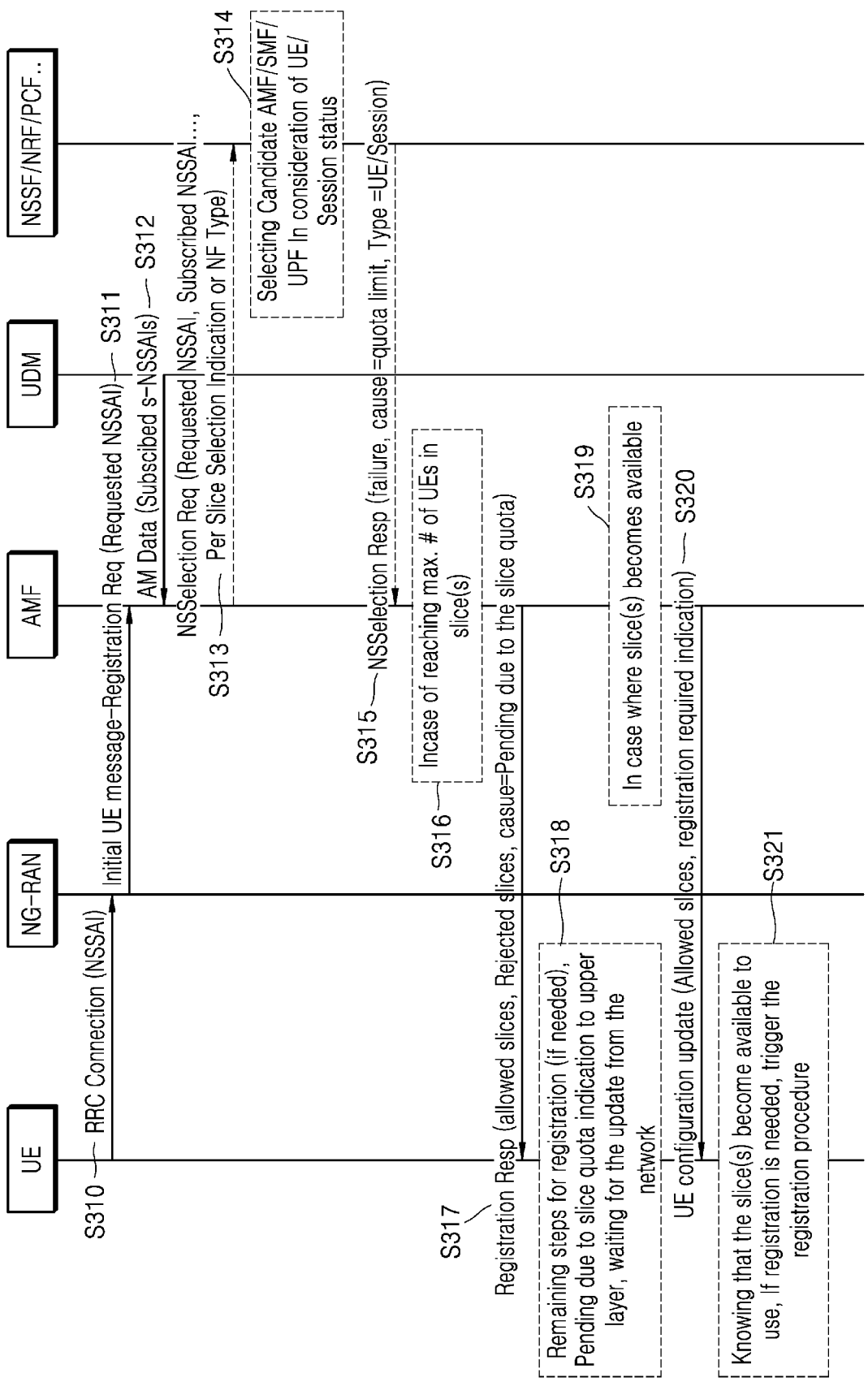
FIG. 3 illustrates a flowchart illustrating a procedure for performing access control for each network slice, according to an embodiment of the disclosure.

FIG. 3 illustrates a flowchart illustrating a procedure for performing access control for each network slice, according to an embodiment of the disclosure.

Referring to FIG. 3, the NSSF 134 may provide information of a network slice. Instead of the NSSF 134, however, the NRF 153, the SCP 157, or the PCF 154 may also provide the information of the network slice.

In operation S310, the UE 120 may select a network slice that the UE 120 intends to access, and transmit a connection request (e.g., radio resource control (RRC) connection (network slice selection assistance information (NSSAI)) message to the NG-RAN 110. In FIG. 3, the NG-RAN 110 is an example of a base station, without being limited thereto. That is, any type of base station may be used for the NG-RAN 110.

In operation S311, the NG-RAN 110 may select the AMF 131 by using a network slice identifier specified by the UE 120, and forward an initial UE message including a registration request (e.g., Registration Req (Requested NSSAI)) to the AMF 131 based on the connection request message, e.g., N1 (NAS) message (e.g., the registration request message) transmitted by the UE 120.

The AMF 131 may perform an operation to process the registration request message transmitted by the UE 120 through the NG-RAN 110. When the AMF 131 needs to receive subscription data of the UE 120, the AMF 131 may receive the subscription data from the UDM 155, in which case access and mobility related subscription data may include information of a slice, to which the UE 120 is subscribed (one or more pieces of subscribed S-NSSAI), in operation S312.

In operation S313, when a new network slice needs to be selected for the UE 120, or the network slice in question needs to be changed, or a new AMF that belongs to the network slice needs to be selected, the AMF 131 may transmit a network slice selection request (NSSelection Req) message to the NSSF 134. The network slice selection request (NSSelection Req) message may be used through Nnssf_NSSelection service's GET operation provided by the NSSF 134. In this case, information for slice selection may be requested not only from the NSSF 134 but from the NRF 153, the SCP 157, or the PCF 154. For this, service operation for each NF may be used, or information stored in the AMF 131 may be used. When the AMF 131 transmits the network slice selection request (NSSelection Req) message, the AMF may include network slice identifiers requested by the UE 120 (requested NSSAI) and network slice identifiers included in the subscription data (subscribed NSSI) in the network slice selection request (NSSelection Req) message. Furthermore, when the AMF 131 transmits the network slice selection request (NSSelection Req) message, the AMF 131 may inform that targets to be selected are all NFs included in the network slice or designate a particular NF type to be selected in the network slice.

In operation S314, the NSSF 134 may perform an operation to select a network slice at the request of the AMF 131. In this case, information for each slice (e.g., maximum capacity or current load (quantity used) for the slice) received from an NF or operations, administration and management (OAM) or stored may be taken into account. When the request of the AMF 131 is about the whole network slice, the network slice and candidate NFs included in the network slice may be selected, taking into account the whole status of the network slice. For example, when the network slice includes the AMF 131, the SMF 132, and the UPF 133, the AMF 131, the SMF 132, and the UPF 133 may all be included in the candidate NFs. When the request of the AMF 131 designates a particular NF that belongs to the network slice, candidate NFs having the corresponding NF type may be selected. When the network slice is made up with instances, a network slice instance may be selected. When there are several NFs or instances to be selected, the NFs or instances may be selected such that the load is distributed in consideration of a maximum capacity received and a current load state.

In operation S315, in response to the network slice selection request (NSSelection Req) message from the AMF 131, the NSSF 134 may deliver a network slice selection response that includes network slice information to the AMF 131. In this case, the network slice selection response may be implemented in the form of Nnssf_NSSelection Service, and may include authorized network slice information (AuthorizedNetworkSliceInfo) that includes information of the previously selected network slice. For example, when the request of the AMF 131 is about the whole network slice, the network slice and candidate NFs included in the network slice may be included in the AuthorizedNetworkSliceInfo, taking into account the whole status of the network slice. When the network slice includes the AMF 131, the SMF 132, and the UPF 133, information of candidates of the AMF 131, the SMF 132, and the UPF 133 may be included. When the request of the AMF 131 designates a particular NF that belongs to the network slice, candidate NFs having the corresponding NF type may be included. When the network slice is made up with instances, a slice instance may be included. The information including the network slice may be made up in the form of a name or identifier to identify the selected network slice candidate or the selected instance. When selection of a network slice or an NF that is able to deal with the request has failed, e.g., when the network slice exceeds its allowable quota, the NSSF 134 may transmit a result and/or cause of the failure in the network slice selection response message. By doing this, the NSSF 134 may inform the AMF 131 of the cause of the NF selection failure. In the embodiment of the disclosure, in allowable quota based control for a slice, a detailed cause (e.g., of the quota, which one-the number of UEs/subscribers, the number of sessions, or the like—has reached the highest value) may be informed.

In operation S316, access control for a situation where of the slice's quota, the maximum number of users (or UEs) of the slice is about to be exceeded or the maximum number of sessions belonging to the particular slice is about to be exceeded is considered. The AMF 131 may know based on the slice information received in operation S315 that the corresponding condition has occurred to one or more slices requested by the UE 120 for access.

In operation S317, the AMF 131 transmits a response message to the registration request to the UE 120 that has transmitted the registration request. When the slice requested by the UE 120 is allowed to be accessed based on the subscription data but actual access to the slice is restricted due to the quota limit, or when one or more of the slices requested by the UE 120 may be accessed, the response message may be an accept (e.g., registration accept) message. When access to the slice is restricted due to the quota limit, the response message may include rejected slice information which may indicate that the quota (the number of users that access the slice, the number of slice sessions, etc.) limit is a cause of the rejection, i.e., a cause of why the access is pending. In this process, the AMF 131 is required to have stored information about the requested slice and the slice, access to which is pending due to the quota limit, in a UE context for the UE 120.

In operation S318, upon reception of the registration response from the AMF 131, the UE 120 performs the rest of the registration process. When the received response message includes information indicating that access to a particular slice or slices is rejected due to the quota limit and the access to the slice is pending, an operation (traffic transmission to the slice and PDU session creation process for the traffic transmission) using the slice is suspended and may not be proceeded until separate accept information is received from the network. Optionally, the UE 120 may notify an upper layer that access to the particular slice or slices is rejected due to the quota limit for the slice and the access is pending, so that a service application may operate by taking this into account or perform an operation such as transmitting an alarm to the user.

In operation S319, in the aforementioned processes, when a certain slice among the slices, access to which is pending due to the slice quota limit, becomes accessible (i.e., the slice shifts into a state of having less accesses than the quota of the slice), the AMF 131 may find whether there is a UE whose access is pending and start an operation to notify the UE that the slice becomes accessible, based on the UE context stored.

In operation S320, the AMF 131 may transmit information indicating that a slice becomes accessible to the UE 120 whose access to the slice was pending due to the quota limit of the slice but is allowed now. In this case, the AMF 131 may give the information using a UE configuration update procedure. Specifically, a corresponding NAS message may indicate that identifiers of the slices (s-nassai), access to which was originally rejected and pending, are included in allowed slices (Allowed nassai), and an indicator indicating that the slices, access to which was pending due to the quota limit, become available. When a change of the AMF 131 is required or a separate registration process is required due to update of an allowed slice (e.g., when a service/mobility allowable region is required to be changed), indication that a registration procedure of the UE 120 is required may be included.

In operation S321, the UE 120 may know from the message received from the AMF 131 that the slice(s), access to which was originally pending, is now accessible. Accordingly, the UE 120 may perform an additional procedure required, e.g., a procedure of session creation for traffic transmission through the slice, and when the message received includes information indicating that a separate registration process is required, the UE 120 may perform the registration procedure.

Figure 4:
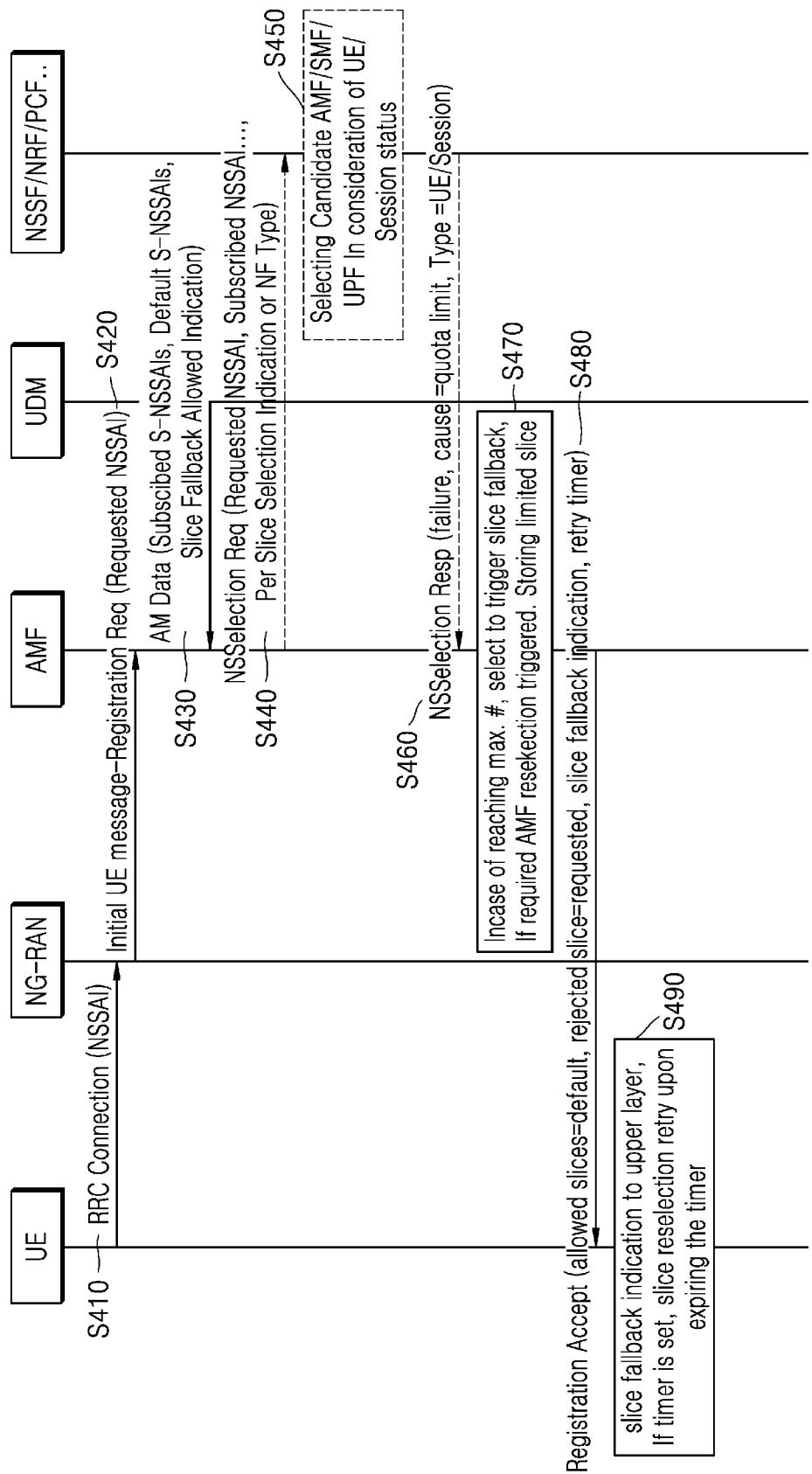
FIG. 4 illustrates another flowchart illustrating a procedure for performing access control for each network slice, according to an embodiment of the disclosure.

FIG. 4 illustrates a flowchart illustrating a procedure for performing access control for each network slice, according to an embodiment of the disclosure.

Referring to FIG. 4, an occasion when the NSSF 134 provides information of a network slice is shown. In this regard, however, the NSSF 134 may be replaced by the NRF 153, the SCP 157, or the PCF 154.

In operation S410, the UE 120 may select a network slice that the UE 120 intends to access, and transmit a connection request (e.g., RRC connection (NSSAI)) message to the NG-RAN 110. In FIG. 4, the NG-RAN 110 is an example of a base station, without being limited thereto. That is, any type of base station may be used for the NG-RAN 110.

In operation S420, the NG-RAN 110 may select the AMF 131 by using a network slice identifier specified by the UE 120, and forward an initial UE message including a registration request (e.g., Registration Req (Requested NSSAI)) to the AMF 131 based on the connection request message, e.g., N1 (NAS) message (e.g., the registration request message as described above) transmitted by the UE 120.

In operation S430, the AMF 131 may perform an operation to process the registration request message transmitted by the UE 120 through the NG-RAN 110. When the AMF 131 needs to receive subscription data of the UE 120, the AMF 131 may receive the subscription data from the UDM 155, in which case access and mobility related subscription data may include information of a slice to which the UE subscribes (one or more pieces of subscribed S-NSSAI) and information of a default available slice (one or more pieces of Default S-NSSAI). When it is hard for the UE 120 to access the slice the UE 120 has requested or the slice exceeds its access capacity or quota, the subscription data may include whether fallback to another slice is allowed.

In operation S440, when a new network slice needs to be selected for the UE 120, or the network slice in question needs to be changed, or a new AMF that belongs to the network slice needs to be selected, the AMF 131 may transmit a network slice selection request (NSSelection Req) message to the NSSF 134. The network slice selection request (NSSelection Req) message may be used through Nnssf_NSSelection service's GET operation provided by the NSSF 134. In this case, information for slice selection may be requested not only from the NSSF 134 but from the NRF 153, the SCP 157, or the PCF 154. For this, service operation for each NF may be used, or information stored in the AMF 131 may be used. When the AMF 131 transmits the network slice selection request (NSSelection Req) message, the AMF 131 may insert network slice identifiers requested by the UE 120 (requested NSSAI) and network slice identifiers included into the subscription data (subscribed NSSI) in the network slice selection request (NSSelection Req) message. Furthermore, when the AMF 131 transmits the network slice selection request (NSSelection Req) message, the AMF 131 may inform that targets to be selected are all NFs included in the network slice or designate a particular NF type to be selected in the network slice.

In operation S450, the NSSF 134 may perform an operation to select a network slice at the request of the AMF 131. In this case, information for each slice (e.g., maximum capacity for each slice or current load (quantity used)) received from an NF or OAM or stored may be taken into account. When the request of the AMF 131 is about the whole network slice, the network slice and candidate NFs included in the network slice may be selected, taking into account the whole status of the network slice. For example, when the network slice includes the AMF 131, the SMF 132, and the UPF 133, the AMF 131, the SMF 132, and the UPF 133 may all be included in the candidate NFs. When the request of the AMF 131 designates a particular NF that belongs to the network slice, candidate NFs having the corresponding NF type may be selected. When the network slice is made up with instances, a network slice instance may be selected. When there are several NFs or instances to be selected, the NFs or instances may be selected such that the load is distributed in consideration of a maximum capacity or quota and a current load state.

In operation S460, in response to the network slice selection request (NSSelection Req) message from the AMF 131, the NSSF 134 may deliver a network slice selection response that includes network slice information to the AMF 131. In this case, the network slice selection response may be implemented in the form of Nnssf_NSSelection Service, and may include authorized network slice information (AuthorizedNetworkSliceInfo) that includes information of the previously selected network slice. For example, when the request of the AMF 131 is not limited to the AMF but about the whole network slice, the network slice and an identifier of the network slice instance or candidate NFs included in the network slice may be selected in AuthorizedNetworkSliceInfo, taking into account the whole status of the network slice. When the network slice includes the AMF 131, the SMF 132, and the UPF 133, information of candidates of the AMF 131, the SMF 132, and the UPF 133 may be included. When the request of the AMF 131 designates a particular NF that belongs to the network slice, candidate NFs having the corresponding NF type may be included. When the network slice is made up with instances, a slice instance may be included. The information including the network slice may be made up in the form of a name or identifier to identify the selected candidate or the selected instance. When selection of a network slice or an NF that is able to deal with the request has failed, e.g., when the network slice exceeds its allowable quota, the NSSF 134 may transmit a result and/or cause of the failure in the network slice selection response message. By doing this, the NSSF 134 may inform the AMF 131 of the cause of the NF selection failure. In the embodiment of the disclosure, in allowable quota based control for a slice, a detailed cause (e.g., of the quota, which one-the number of UEs/subscribers, the number of sessions, or the like—has reached the highest value) may be informed.

In operation S470, access control for a situation where of the slice's quota, the maximum number of users (or UEs) of the slice is exceeded or the maximum number of sessions belonging to a particular slice is exceeded is considered. The AMF 131 may know based on the slice information received in operation S460 that a corresponding condition has occurred to one or more slices requested to be accessed by the UE 120. In this case, the AMF 131 may allow the UE 120 to change and have access to a default slice, thereby enabling a default service to be provided for the UE 120 through the default slice yet having difficulty in providing services through the slice requested by the UE 120.

In operation S480, the AMF 131 transmits a response message to the registration request to the UE 120. When the slice requested by the UE 120 is allowed to be accessed based on the subscription data but actual access to the slice is restricted due to the quota limit, or when one or more of the slices requested by the UE 120 may be accessed, the response message may be an accept (e.g., registration accept) message. In the case that access to the slice is restricted due to the quota limit and that the UE 120 is guided to change and have access to another default slice, an allowed slice (allowed nssai) may include an identifier of the allowed slice and a rejected slice (rejected nssai) may include an identifier of the rejected slice in the response message. This information may indicate that the quota (e.g., the number of users accessing the slice, the number of sessions of the slice, etc.) limit is a cause of the rejection and access to the slice is pending. The message may further include an indication that the UE 120 is allowed to change and have access to another slice because the slice originally requested by the UE 120 is hardly accessed. Furthermore, the message may include information of an allowed DNN indicating that a DNN mapped to the slice originally requested is available for the default slice. Moreover, the message may include a timer value used when whether to try re-access to the slice, access to which is pending due to the limit of quota, i.e., the maximum number of accesses, is determined. In this process, the AMF 131 is required to have stored information about the requested slice and the slice, access to which is pending due to the quota limit, in a UE context for the UE 120.

In operation S490, upon reception of the registration response from the AMF 131, the UE 120 performs the rest of the registration process. When the received response message includes information indicating that access to a particular slice or slices is rejected due to the quota limit and the access to the slice is pending, an operation (traffic transmission to the slice and PDU session creation process for the traffic transmission) using the slice is suspended and the UE 120 may not re-try the access until the UE 120 receives separate accept information from the network or until the timer is expired when the timer for retry has been received. When the accept message includes information indicating that services through the default slice are available, the UE 120 may receive the service through the default slice. Furthermore, the UE 120 may optionally notify an upper layer that access to the particular slice or slices is rejected due to the quota limit for each slice and the access to the slice is pending, so that a service application may operate by taking this into account or transmit an alarm to the user.

As described above in connection with FIG. 3, when the slice becomes accessible, the AMF 131 may notify the UE 120 of this, i.e., operations S319 to S321 may be equally applied in FIG. 4.

Figure 5:
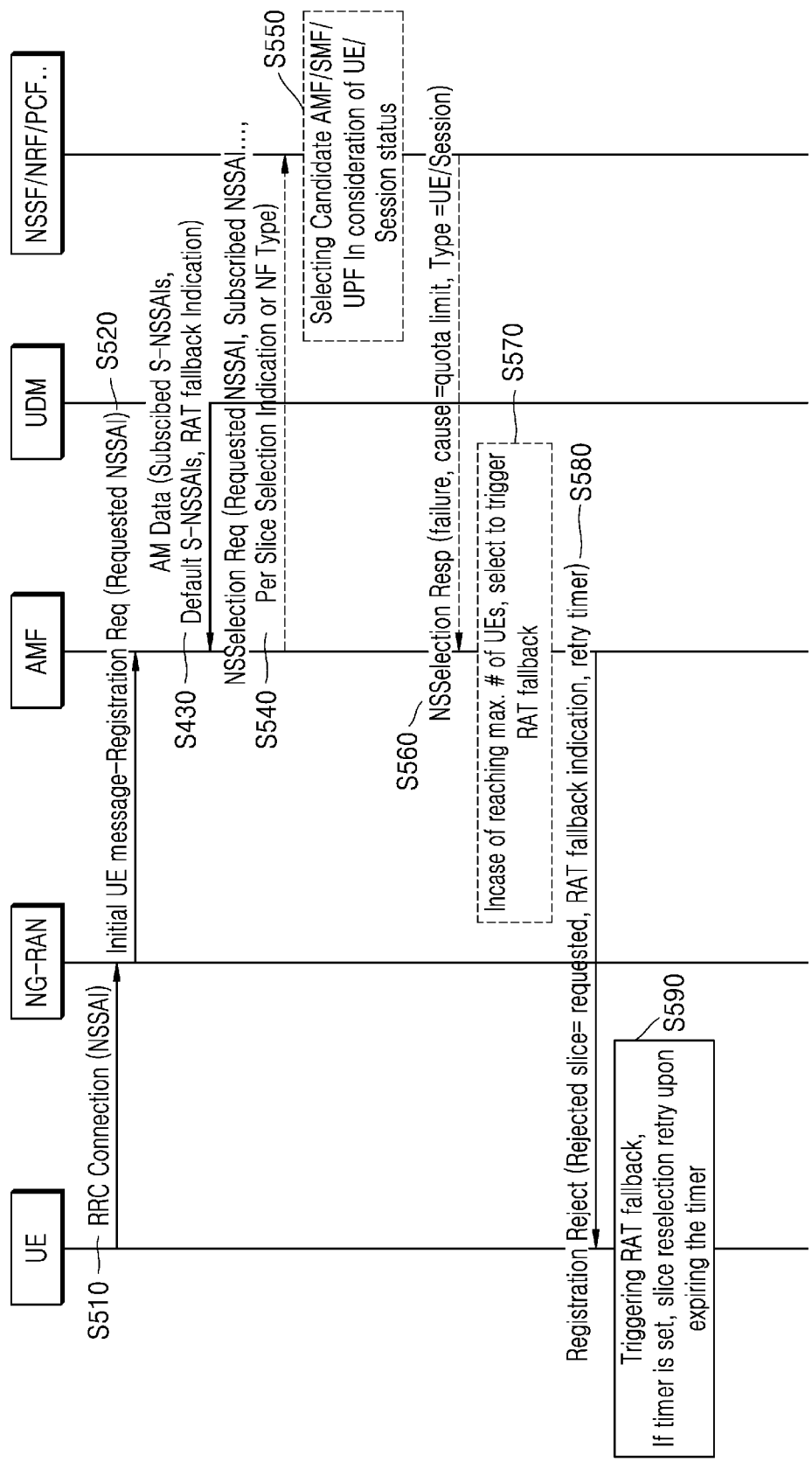
FIG. 5 illustrates a flowchart illustrating a procedure of shifting a user equipment (UE) into another radio access to provide a service, according to an embodiment of the disclosure.

FIG. 5 illustrates a flowchart illustrating a procedure of shifting a UE into another radio access type to provide a service, according to an embodiment of the disclosure.

Referring to FIG. 5, the NSSF 134 may provide information of a network slice. In this regard, however, the NSSF 134 may be replaced by the NRF 153, the SCP 157, or the PCF 154.

In operation S510, the UE 120 may select an access type and a network slice that the UE 120 intends to access, and transmit a connection request (e.g., RRC connection (NSSAI)) message to the NG-RAN 110. In FIG. 5, it is noted that the NG-RAN 110 is an example of a base station, without being limited thereto. That is, any type of base station may be used for the NG-RAN 110.

In operation S520, the NG-RAN 110 may select the AMF 131 by using a network slice identifier specified by the UE 120, and forward an initial UE message including a registration request (e.g., Registration Req (Requested NSSAI)) to the AMF 131 based on the connection request message, e.g., N1 (NAS) message (e.g., the registration request message as described above) transmitted by the UE 120.

In operation S530, the AMF 131 may perform an operation to process the registration request message transmitted by the UE 120 through the NG-RAN 110. When the AMF 131 needs to receive subscription data of the UE 120, the AMF 131 may receive the subscription data from the UDM 155, in which case access and mobility related subscription data may include information of a slice to which the UE subscribes (one or more pieces of subscribed S-NSSAI), information of a default available slice (one or more pieces of Default S-NSSAI), and information of an allowed wireless network (access type), and the subscription data may additionally include whether fallback of the UE 120 to a particular access type is allowed when it is hard for the UE 120 to access the slice the UE 120 has requested or the slice exceeds its access capacity or quota.

In operation S540, when a new network slice needs to be selected for the UE 120, or the network slice in question needs to be changed, or a new AMF that belongs to the network slice needs to be selected, the AMF 131 may transmit a network slice selection request (NSSelection Req) message to the NSSF 134. The network slice selection request (NSSelection Req) message may be used through Nnssf_NSSelection service's GET operation provided by the NSSF 134. In this case, information for slice selection may be requested not only from the NSSF 134 but from the NRF 153, the SCP 157, or the PCF 154. For this, service operation for each NF may be used, or information stored in the AMF 131 may be used. To transmit the network slice selection request (NSSelection Req) message, the AMF 131 may insert network slice identifiers requested by the UE 120 (requested NSSAI) and network slice identifiers included in the subscription data (subscribed NSSI) into the network slice selection request (NSSelection Req) message. Furthermore, when transmitting the network slice selection request (NSSelection Req) message, the AMF 131 may inform that targets to be selected are all NFs included in the network slice or designate a particular NF type to be selected in the network slice.

In operation S550, the NSSF 134 may perform an operation to select a network slice at the request of the AMF 131. In this case, information for each slice (e.g., maximum capacity for each slice or current load (quantity used)) received from an NF or OAM or stored may be taken into account. When the request of the AMF 131 is about the whole network slice, the network slice and candidate NFs included in the network slice may be selected, taking into account the whole status of the network slice. For example, when the network slice includes the AMF 131, the SMF 132, and the UPF 133, the AMF 131, the SMF 132, and the UPF 133 may all be included in the candidate NFs. When the request of the AMF 131 designates a particular NF that belongs to the network slice, candidate NFs having the corresponding NF type may be selected. When the network slice is made up with instances, a network slice instance may be selected. When there are several NFs or instances to be selected, the NFs or instances may be selected such that the load is distributed in consideration of a maximum capacity or quota received and a current load state.

In operation S560, in response to the network slice selection request (NSSelection Req) message from the AMF 131, the NSSF 134 may deliver a network slice selection response that includes network slice information to the AMF 131. In this case, the network slice selection response may be implemented in the form of Nnssf_NSSelection Service, and may include authorized network slice information (AuthorizedNetworkSliceInfo) that includes previously selected network slice information. For example, when the request of the AMF 131 is about the whole network slice, the network slice and candidate NFs included in the network slice may be selected in the AuthorizedNetworkSliceInfo, taking into account the whole status of the network slice. When the network slice includes the AMF 131, the SMF 132, and the UPF 133, the AMF 131, the SMF 132, and the UPF 133 may include information of candidates of them. When the request of the AMF 131 designates a particular NF that belongs to the network slice, slice information included in a response message may include candidate NFs that correspond to the corresponding NF type. When the network slice is made up with instances, an instance may include a slice instance. The information including the network slice may be made up in the form of a name or identifier to identify the selected candidate or the selected instance. When selection of a network slice or an NF that is able to deal with the request has failed, e.g., when the network slice exceeds its allowable quota, the NSSF 134 may transmit a result and/or cause of the failure in the network slice selection response message. By doing this, the NSSF 134 may inform the AMF 131 of the cause of the NF selection failure. In the allowable quota based control for a slice in particular, the NSSF 134 may give information about a detailed cause (e.g., of the quota, which one-the number of UEs/subscribers, the number of sessions, or the like—has reached the highest value).

In operation S570, access control for a situation where of the slice's quota, the maximum number of users (or UEs) of the slice is exceeded or the maximum number of sessions belonging to the particular slice is exceeded is considered. The AMF 131 may know based on the slice information received in operation S560 that a corresponding condition has occurred to one or more slices requested by the UE 120 for access. In this case, the AMF 131 may allow the UE 120 to have access to another RAT so that the UE 120 may receive a default service from the other RAT although hardly receiving a service through a slice requested by a RAT currently requested by the UE 120 for access.

In operation S580, the AMF 131 transmits a response message to the registration request to the UE 120 that has transmitted the registration request. When access to all the slices requested by the UE 120 is restricted due to the quota limits, the response message may be a UE registration reject message. When access to the slice is restricted due to the quota limit, rejected slice information (rejected nssai) may include an identifier of the rejected slice and may indicate that quota (the number of users accessing the slice, the number of sessions of the slice, etc.) limit is a cause of the rejection of the access. The response message may also include an indication to guide access through a particular RAT. Moreover, the response message may include a timer value used when whether to try re-access to the current RAT and slice, access to which has been rejected due to the limit of quota, i.e., the maximum number of accesses, is determined. In this process, the AMF 131 is required to have stored information about the requested slice and the slice, access to which is pending due to the quota limit, in a UE context for the UE 120.

In the meantime, guiding the UE 120 to access the particular RAT may be informed by the AMF 131 directly to the UE 120 in an NAS response as described above. Furthermore in another embodiment of the disclosure, the AMF 131 may insert information (RFSP Index or SPID) guiding the UE 120 to increase priority of access to the particular RAT (in the embodiment of the disclosure, another RAT to be accessible when the slice exceeds its capacity) into a message transmitted to the NG-RAN 110, and the NG-RAN 110, upon receiving the message, may change a radio access configuration of the UE 120 to increase priority of access to the particular RAT.

In operation S590, the UE 120 that has received a registration response from the AMF 131 may shift to a particular RAT to perform an operation for receiving a service when the response message includes information to access the particular RAT and operate accordingly. When a retry timer is included in the message received from the AMF 131, the UE 120 may not retry the registration request for the rejected slice in the original RAT until the timer is expired. When the timer is expired, the UE 120 may change the RAT again and try registration request for the corresponding slice. Furthermore the UE 120 may optionally notify an upper layer that access to the particular slice or slices is rejected due to the quota limit for each slice and a change in RAT is to be made, so that a service application may operate by taking this into account or may be guided to an operation e.g., transmitting an alarm to the user.

Even in the embodiment of the disclosure, as described above in connection with FIG. 3, when the slice becomes accessible, the AMF 131 may notify the UE 120 of this, i.e., operations S319 to S321 may be equally applied in the embodiment of the disclosure. In a case that a system accessed by the UE 120 is to be changed to 4G rather than 5G according to the aforementioned operations, a mobility management entity (MME) (not shown) may receive information indicating that a particular slice has become available from a 5G NF such as the AMF 131 or the UDM 155, and the message may be forwarded to the UE 120 from the MME instead of the AMF 131. Furthermore, the UE 120 may additionally perform an operation to change the RAT before performing a registration procedure.

Figure 6:
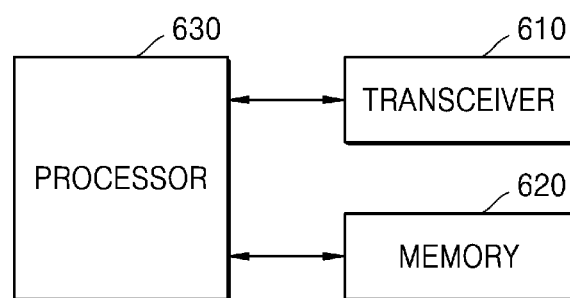
FIG. 6 illustrates a block diagram illustrating a configuration of a UE, according to an embodiment of the disclosure.

FIG. 6 illustrates a block diagram illustrating a configuration 7 of a UE, according to an embodiment of the disclosure.

Referring to FIG. 6, the UE in the disclosure may include a transceiver 610, a memory 620, and a processor 630. The transceiver 610, the memory 620, and the processor 630 of the UE may operate according to the aforementioned communication method of the UE. Components of the UE are not, however, limited thereto. For example, the UE may include more or fewer elements than described above. In addition, the transceiver 610, the memory 620, and the processor 630 may be implemented in a single chip.

The transceiver 610 is a collective term of a UE transmitter and a UE receiver, and may transmit or receive a signal to or from a base station. The signals to be transmitted to or received from the BS may include control information and data. For this, the transceiver 610 may include an RF transmitter for up-converting the frequency of a signal to be transmitted and amplifying the signal and an RF receiver for low-noise amplifying a received signal and down-converting the frequency of the received signal. Transceiver 610 is merely an example, and the elements of the transceiver 610 are not limited to the RF transmitter and RF receiver.

In addition, the transceiver 610 may receive a signal on a wireless channel and output the signal to the processor 630, or transmit a signal output from the processor 630 on a wireless channel.

The memory 620 may store a program and data required for operation of the BS. Furthermore, the memory 620 may store control information or data included in a signal obtained by the UE. The memory 620 may include a storage medium such as a read only memory (ROM), a random access memory (RAM), a hard disk, a compact disc ROM (CD-ROM), and a digital versatile disc (DVD), or a combination of storage mediums.

The processor 630 may control a series of processes for the UE to be operated according to the embodiments of the disclosure. The processor 630 may include at least one processor. For example, the processor 630 may include a communication processor (CP) for controlling communication and an application processor (AP) for controlling an upper layer such as an application program.

Figure 7:
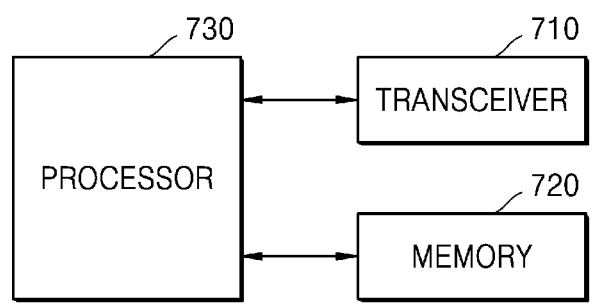
FIG. 7 illustrates a block diagram illustrating a configuration of a network entity, according to an embodiment of the disclosure.

FIG. 7 illustrates a block diagram illustrating a configuration of a network entity, according to an embodiment of the disclosure.

Referring to FIG. 7, a network entity in the disclosure may include a transceiver 710, a memory 720, and a processor 730. The transceiver 710, the memory 720, and the processor 730 of the network entity may operate according to the aforementioned communication method of the network entity. Components of the network entity are not, however, limited thereto. For example, the network entity may include more or fewer elements than described above. In addition, the transceiver 710, the memory 720, and the processor 730 may be implemented in a single chip. The network entity may include NFs such as an AMF, an SMF, a PCF, a NEF, a UDM, a UPF, etc., as described above. Furthermore, the network entity may include a base station.

The transceiver 710 is a collective term of a network entity transmitter and a network entity receiver, and may transmit or receive a signal to or from a UE or another network entity. The signal to be transmitted to or received may include control information and data. For this, the transceiver 710 may include an RF transmitter for up-converting the frequency of a signal to be transmitted and amplifying the signal and an RF receiver for low-noise amplifying a received signal and down-converting the frequency of the received signal. Transceiver 710 is merely an example, and the elements of the transceiver 710 are not limited to the RF transmitter and RF receiver. The transceiver 710 may include a wired/wireless transceiver, including various components for signal transmission and reception.

In addition, the transceiver 710 may receive a signal on a communication channel (e.g., a wireless channel) and output the signal to the processor 730, or transmit a signal output from the processor 730 on the communication channel.

The memory 720 may store a program and data required for an operation of the network entity. Furthermore, the memory 720 may store control information or data included in a signal obtained by the network entity. The memory 720 may include a storage medium such as a ROM, a RAM, a hard disk, a CD-ROM, and a DVD, or a combination of storage mediums.

The processor 730 may control a series of processes for the network entity to be operated according to the embodiments of the disclosure. The processor 730 may include at least one processor.

Figure 8:
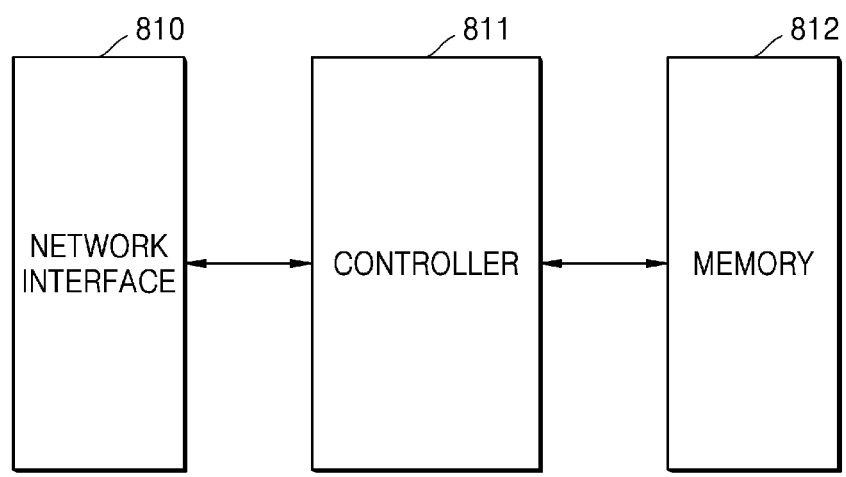
FIG. 8 illustrates another block diagram illustrating a configuration of a network entity, according to an embodiment of the disclosure.

FIG. 8 illustrates another block diagram illustrating a configuration of a network entity, according to an embodiment of the disclosure.

The network entity of FIG. 8 may be configured to correspond to the configuration of the network entity as described above in connection with FIG. 7. In FIG. 8, the network entity may include NFs, which may include the AMF 131, the SMF 132, and the UPF 133, as described above. In addition, the NFs may include the NSSF 134, the NFR 153, and the SCP 157. In another example, the NFs may be implemented as separate network entities.

Referring to FIG. 8, a network interface 810 may communicate with another network entity in a core network. For example, when the NF is the AMF 131, the NF may communicate with the SMF 132, the UPF 133, the NSSF 134, the NRF 153, and/or the SCP 157. In another example, when the NF is the SMF 132, the NF may communicate with the AMF 131, the UPF 133, the NSSF 134, the NRF 153, and/or the SCP 157. In still another example, when the NF is the NSSF 134, the NF may communicate with the AMF 131, the UPF 133, the SMF 132, the NRF 153, and/or the SCP 157. Likewise, when the NF is a certain network entity, the NF may communicate with other entities in the core network.

A controller 811 may be implemented with at least one processor and/or program for performing an operation of the NF. For example, when the NF is the AMF 131, the controller 811 may perform the aforementioned operation of the AMF 131. In another example, when the NF is the NSSF 134, the controller may perform the aforementioned operation of the NSSF 134. Even for another network entity, the controller 811 may control the aforementioned operation of the network entity.

A memory 812 may store a program and various kinds of control information required by the controller 811, and the respective information as described above. For example, when the NF is the AMF 131, the memory 812 may store the aforementioned information received from the AMF 131 or an external entity. In another example, when the NF is the NSSF 134, the memory 812 may store control information required by the NSSF 134 and/or information received. Even for another network entity, the memory 812 may store information required for the aforementioned operation of the network entity.

Figure 9:
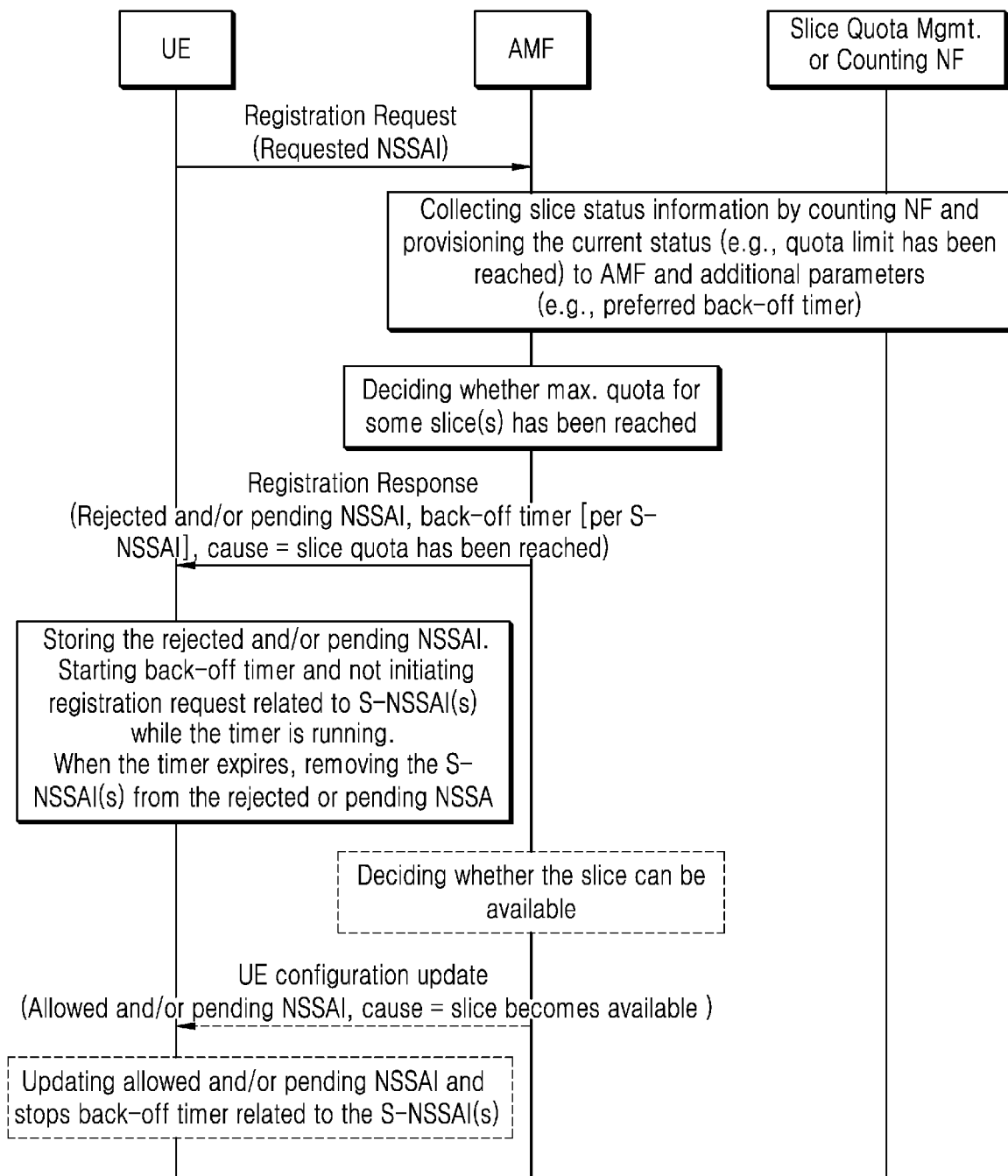
FIG. 9 illustrates a flowchart illustrating operations between a UE and a network, according to an embodiment of the disclosure.

FIG. 9 illustrates a flowchart illustrating operations between a UE and a network, according to an embodiment of the disclosure.

In operation 1, a UE transmits a registration request message requesting to use a certain slice to an AMF. The message may include a set of identifiers (S-NSSAI) of target slices that the UE requests permission to use, i.e., Requested NSSAI. The message may include information indicating whether to support a function for quota management for each slice (cause reception, back-off timer use, rejected/pending NSSAI handling, etc.) or whether to support a generic network slice template (gst) based slice control function, which may be included as part of 5G mobility management (5GMM) capability in the registration request.

In operation 2, when there is a slice among slices in the network, whose quota (limitation of the maximum number of concurrent access UEs/subscribers) is to be managed, the AMF may identify current status of the slice (status of the number of currently concurrent access UEs/subscribers for the slice, whether a new UE/subscriber is additionally accepted or not, etc.). The identification may be performed by exchanging information between an NF that manages the quota of the slice in the network (counts the number of access UEs/subscribers of the slice) and the AMF. Specifically, the NF that manages the quota (e.g., an NF that manages the slice quota, or a counting NF) may collects the number of UEs currently registered for each slice from other NFs (e.g., AMF) in the network, and considering this comprehensively, determine whether the number of UEs has reached the maximum number of concurrent access UEs set for the slice. The slice quota management NF may determine and deliver to the AMF information of the slice (at least one of a total number of access UEs for the current slice, the maximum allowable number of concurrent UEs of the slice, or whether a new UE is allowed to access the current slice or whether the quota limit of the slice has been reached), and parameters (e.g., a cause value and preferred back-off timer) to be used when access to the slice is restricted. The operations 1 and 2 may be performed separately or in a reverse order.

In operation 3, the AMF may process the registration request of the UE. When the UE determines that there is a slice whose quota (a limit of the maximum number of concurrent access UEs/subscribers) is to be managed, among slices identified by S-NSSAIs included in Requested NSSAI requested by the UE, the UE may determine, based on the information received in operation 2, whether the UE is allowed to register for the slice according the current status of the slice. Parameters set by the AMF to control the UE may be applied in this and following operations when the AMF is informed in the operation 1 that the UE supports a quota based slice control function or a GST based slice control function.

In operation 4, when the slice quota reaches an upper limit or access to the slice needs to be restricted, the AMF may include information relating to access restriction based on quota management for each slice in a registration response (e.g., registration accept or registration reject) message to be transmitted to the UE. When access to a slice corresponding to at least one of S-NSSIs included in the UE requested NSSI is restricted, the AMF may operate by selecting one of the following three options:

Option 1: the AMF may insert identifiers corresponding to slices, to which access is restricted because the slice quota has reached its upper limit, into rejected NSSAI. For the rejected NSSAI, an identifier may be established to indicate whether the NSSAI is rejected from the entire PLMN or from a current registration area RA. A cause may be established to indicate that the request is rejected because the slice quota (the maximum number of concurrent access UEs) has reached the upper limit. Furthermore, a back-off timer value is set to limit the registration request of the UE for the slice. The back-off timer value may be received in the operation 2 or determined based on subscription data (differentiated by a subscription level or priority of a subscriber) or internal settings of the AMF, and may have a different value for each S-NSSAI. The aforementioned parameters may be included in the registration response (e.g., accept or reject) message to be transmitted to the UE. When access to all the S-NSSAIs requested by the UE is restricted in particular, the response message may be the registration reject message.

Option 2: the AMF may insert identifiers (S-NSSAIs) corresponding to slices, to which access is restricted because the slice quota has reached its upper limit, into pending NSSAI. A cause may be established to indicate that the request is suspended because the slice quota (the maximum number of concurrent access UEs) has reached the upper limit. A back-off timer value is set to limit the registration request of the UE for the slice. The back-off timer value may be received in the operation 2 or determined based on subscription data (differentiated by a subscription level or priority of a subscriber) or internal settings of the AMF, and may have a different value for each S-NSSAI. The aforementioned parameters may be included in the registration response (e.g., accept or reject) message to be transmitted to the UE.

Option 3: the AMF may establish a cause indicating that the request is suspended because the slice quota (the maximum number of concurrent access UEs) has reached the upper limit. A back-off timer value and its target S-NSSAI may be set to limit the registration request of the UE for the slice. The back-off timer value may be received in the operation 2 or determined based on subscription data (differentiated by a subscription level or priority of a subscriber) or internal settings of the AMF, and may have a different value for each S-NSSAI. The aforementioned parameters may be included in the registration response (e.g., accept or reject) message to be transmitted to the UE.

The AMF may store the information (the rejected or pending NSSAI and associated cause, or the back-off timer value) in a context of the UE.

In operation 5, the UE may store the information received from the AMF in the registration response message in operation 4. When the message received by the UE includes a cause indicating that access to a slice is restricted due to the quota limit of the slice, and a back-off timer vale, the UE may start a back-off timer and may not transmit a registration request for an associated S-NSSAI in the corresponding PLMN until the back-off timer is expired. The UE is unable to expire or cancel the timer even while in cell change, RAT change, PLMN change, or access type change. The UE may operate differently according to the options of the operation 4. Operations of the UE according to options 1 to 3 will now be described.

Option 1: in a case that the UE receives a rejected NSSAI having a cause of the quota limit of the slice, and the rejected NSSAI is applied to the overall PLMN, the registration request of the UE for an S-NSSAI included in the NSSAI in the entire PLMN is not accepted. Furthermore, when the rejected NSSAI is applied to the registration area RA, the registration request may not be accepted in the registration area RA but accepted in other registration areas RAs. When the UE receives the rejected NSSAI having a cause of the quota limit of the slice, the UE may delete a corresponding S-NSSAI from the rejected NSSAI when a back-off timer associated with the S-NSSAI is expired. Subsequently, the UE may start requesting registration for permission for use of the corresponding slice S-NSSAI.

Option 2: in a case that the UE receives a pending NSSAI having a cause of quota limit of the slice, and the NSSAI is applied to the overall PLMN, the registration request of the UE for an S-NSSAI included in the NSSAI in the entire PLMN is not accepted. Furthermore, when the NSSAI is applied to the registration area RA, the registration request may not be accepted in the registration area RA but accepted in other registration areas RAs. When the UE receives the pending NSSAI having a cause of the quota limit of the slice, the UE may delete a corresponding S-NSSAI from the pending NSSAI when a back-off timer associated with the S-NSSAI is expired. Subsequently, the UE may start requesting registration for permission for use of the corresponding slice S-NSSAI.

Option 3: when the UE receives a back-off timer value associated with an S-NSSAI having a cause of the quota limit of a slice, the UE is not able to request registration related to the S-NSSAI while the timer is running, and may start requesting registration for permission for use of the slice S-NSSAI after the timer is expired.

Operation 6 and the subsequent operations may be performed optionally after the previous operation. For example, the operation 6 and the subsequent operations may not be performed.

In operation 6, the AMF may determine whether at least one of the slices that have not accepted new access thereto due to the quota limit becomes newly accessible. This may be performed by receiving the status information of the slice as in the operation 2.

In operation 7, for the slice that becomes accessible, the AMF may deliver information indicating that the slice becomes available to the UE that transmitted an access request for the slice but access of which is pending. When the slice is included in the pending NSSAI for a particular UE, the AMF may change the slice into available state by inserting the slice into the allowed NSSAI. In another method, the AMF may transmit a cause or indicator indicating that the slice is in a state of allowing an access request for the slice while maintaining the pending NSSAI status for the UE. Alternatively, the AMF may set the back-off timer of the slice to '0' and transmit the value to the UE. In operation 7, when the UE transmitted a registration request, the registration response message may be used, and otherwise, a UE configuration update message may be used.

In operation 8, the UE may update the status of the slice based on the message received from the AMF. When some slices that have been included in the pending NSSAI are included in the allowed NSSAI in the operation 7, the UE may determine that use of the slice is permitted. When the cause or indicator indicates that the slice included in the pending NSSAI is allowed to be requested for access, the UE may expire the back-off timer for the slice and transmit the registration request for the slice. When the UE receives '0' of the back-off timer for a slice, the UE may set a timer value to '0' or expire the timer and transmit a registration request for the slice.

Methods according to the claims of the disclosure or the embodiments of the disclosure described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

In an embodiment of the disclosure, services may be provided more effectively.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have thus been described, but it will be understood that various modifications can be made without departing the scope of the disclosure. Thus, it will be apparent to those ordinary skilled in the art that the disclosure is not limited to the embodiments described, but can encompass not only the appended claims but the equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an access and mobility management function (AMF) entity in a wireless communication system, the method comprising:
   receiving, from a user equipment (UE), a registration request message including a requested network slice selection assistance information (NSSAI) and information indicating that the UE supports a rejected NSSAI related capability, wherein the requested NSSAI contains at least one single NSSAI (S-NSSAI);
   transmitting, to a network function (NF) entity, a request message including information related to a number of UEs registered with the at least one S-NSSAI;
   receiving, from the NF entity, a response message including information indicating a maximum number of UEs for the at least one S-NSSAI being reached or not being reached; and
   transmitting, to the UE, a registration response message including a rejected NSSAI with a reject cause, based on the registration request message.

2. The method of claim 1,
   wherein the information indicating that the UE supports a rejected NSSAI related capability is included in 5G mobility management (5GMM) capability information of the registration request message.

3. The method of claim 1,
   wherein the registration response message includes a back-off timer value related to a rejected S-NSSAI included in the rejected NSSAI.

4. The method of claim 1,
   wherein the registration response message further includes allowed NSSAI in case that a maximum number of UEs has been reached for one or more S-NSSAIs in the requested NSSAI,
   wherein the allowed NSSAI includes at least one allowed S-NSSAI included in the requested NSSAI, and
   wherein the registration response message corresponds to a registration accept message.

5. The method of claim 1,
   wherein the registration response message further includes allowed NSSAI in case that a maximum number of UEs has been reached for all S-NSSAIs in the requested NSSAI and one or more default S-NSSAIs are allowed to the UE,
   wherein the allowed NSSAI includes the one or more default S-NSSAI, and
   wherein the registration response message corresponds to a registration accept message.

6. The method of claim 1,
   wherein the registration response message includes the rejected NSSAI in case that a maximum number of UEs has been reached for all S-NSSAIs in the requested NSSAI, and
   wherein the registration response message corresponds to a registration reject message.

7. The method of claim 1,
   wherein the information indicating the maximum number of UEs for the at least one S-NSSAI being reached or not being reached is identified, based on the information related to the number of UEs registered with the at least one S-NSSAI.

8. The method of claim 1,
   wherein at least one rejected S-NSSAI is included in the rejected NSSAI, based on the requested NSSAI and the information indicating the maximum number of UEs for the at least one S-NSSAI being reached or not being reached.

9. The method of claim 1,
   wherein the reject cause indicates that a S-NSSAI is not available due to maximum number of UEs reached.

10. An access and mobility management function (AMF) entity in a wireless communication system, the AMF comprising:
    a transceiver; and
    at least one processor coupled with the transceiver and configured to:
    receive, from a user equipment (UE) via the transceiver, a registration request message including a requested network slice selection assistance information (NSSAI) and information indicating that the UE supports a rejected NSSAI related capability, wherein the requested NSSAI contains at least one single NSSAI (S-NSSAI),
    transmit, to a network function (NF) entity via the transceiver, a request message including information related to a number of UEs registered with the at least one S-NSSAI,
    receive, from the NF entity via the transceiver, a response message including information indicating a maximum number of UEs for the at least one S-NSSAI being reached or not being reached, and
    transmit, to the UE via the transceiver, a registration response message including a rejected NSSAI with a reject cause, based on the registration request message.

11. The AMF entity of claim 10,
    wherein the information indicating that the UE supports a rejected NSSAI related capability is included in 5G mobility management (5GMM) capability information of the registration request message.

12. The AMF entity of claim 10,
    wherein the registration response message includes a back-off timer value related to a rejected S-NSSAI included in the rejected NSSAI.

13. The AMF entity of claim 10,
    wherein the registration response message further includes allowed NSSAI in case that a maximum number of UEs has been reached for one or more S-NSSAIs in the requested NSSAI, wherein the allowed NSSAI includes at least one allowed S-NSSAI included in the requested NSSAI, and wherein the registration response message corresponds to a registration accept message.

14. The AMF entity of claim 10, wherein the registration response message further includes allowed NSSAI in case that a maximum number of UEs has been reached for all S-NSSAIs in the requested NSSAI and one or more default S-NSSAIs are allowed to the UE, wherein the allowed NSSAI includes the one or more default S-NSSAI, and wherein the registration response message corresponds to a registration accept message.

15. The AMF entity of claim 10, wherein the registration response message includes the rejected NSSAI in case that a maximum number of UEs has been reached for all S-NSSAIs in the requested NSSAI, and wherein the registration response message corresponds to a registration reject message.

16. The AMF entity of claim 10, wherein the information indicating the maximum number of UEs for the at least one S-NSSAI being reached or not being reached is identified, based on the information related to the number of UEs registered with the at least one S-NSSAI.

17. The AMF entity of claim 10, wherein at least one rejected S-NSSAI is included in the rejected NSSAI, based on the requested NSSAI and the information indicating the maximum number of UEs for the at least one S-NSSAI being reached or not being reached.

18. The AMF entity of claim 10, wherein the reject cause indicates that a S-NSSAI is not available due to maximum number of UEs reached.

19. The method of claim 1, wherein the rejected NSSAI with the reject cause is included in the registration response message, based on the information indicating that the UE supports the rejected NSSAI related capability.

* * * * *